US008335928B2

(12) United States Patent
Oshima et al.

(10) Patent No.: US 8,335,928 B2
(45) Date of Patent: Dec. 18, 2012

(54) INFORMATION PROVIDING SYSTEM AND METHOD AND STORAGE MEDIUM

(75) Inventors: Takuya Oshima, Tokyo (JP); Tadashi Suzuki, Tokyo (JP); Atsushi Miura, Kanagawa (JP); Yoshiaki Hirano, Kanagawa (JP)

(73) Assignee: Sony Corporation, Tokyo (JP)

( * ) Notice: Subject to any disclaimer, the term of this patent is extended or adjusted under 35 U.S.C. 154(b) by 412 days.

(21) Appl. No.: 12/258,848

(22) Filed: Oct. 27, 2008

(65) Prior Publication Data

US 2009/0055750 A1    Feb. 26, 2009

Related U.S. Application Data

(63) Continuation of application No. 10/396,513, filed on Mar. 26, 2003, now Pat. No. 7,458,026, which is a continuation of application No. 10/283,145, filed on Oct. 30, 2002, now abandoned.

(30) Foreign Application Priority Data

Oct. 31, 2001    (JP) ................................. 2001-334969

(51) Int. Cl.
*G06Q 99/00* (2006.01)
*G06F 3/00* (2006.01)
*G06F 15/16* (2006.01)
*H04K 1/00* (2006.01)
*H04L 9/00* (2006.01)
*H04L 9/32* (2006.01)
*H04B 5/00* (2006.01)

(52) U.S. Cl. .................... 713/187; 726/2; 726/3; 726/4; 726/5; 713/168; 715/730; 715/732; 715/733

(58) Field of Classification Search .................. 715/733, 715/732, 730; 713/187, 168, 169; 726/4, 726/5, 2, 3
See application file for complete search history.

(56) References Cited

U.S. PATENT DOCUMENTS

| 6,035,402 A | * | 3/2000 | Vaeth et al. ........................ 726/2 |
| 6,061,517 A | | 5/2000 | House et al. |
| 6,092,078 A | * | 7/2000 | Adolfsson ..................... 707/102 |
| 6,131,096 A | | 10/2000 | Ng et al. |

(Continued)

FOREIGN PATENT DOCUMENTS

DE    102 02 558    9/2003

(Continued)

OTHER PUBLICATIONS

Chaum et al., "'Minting' electronic cash," Feb. 1997, Spectrum IEEE, pp. 30-34.

*Primary Examiner* — Jordany Nunez
(74) *Attorney, Agent, or Firm* — Oblon, Spivak, McClelland, Maier & Neustadt, L.L.P.

(57) ABSTRACT

An information providing system and method and a storage medium which provide information services to each client apparatus on which a browser for browsing content and at least one object operate, through the cooperation with the operation of the object. A server apparatus has a view server for providing content to the browser, a communication server for making communication with the object, and an application server for making the view server and the application server cooperate with each other. When a read operation from the object is performed, the communication server notifies the application server of a result of the read operation, thereby providing synchronization between the communication server and the view server.

11 Claims, 10 Drawing Sheets

U.S. PATENT DOCUMENTS

| | | |
|---|---|---|
| 6,223,287 B1 * | 4/2001 | Douglas et al. ............... 713/178 |
| 6,240,517 B1 * | 5/2001 | Nishioka ......................... 726/20 |
| 6,289,320 B1 | 9/2001 | Drummond et al. |
| 6,334,117 B1 | 12/2001 | Covert et al. |
| 6,438,550 B1 * | 8/2002 | Doyle et al. ....................... 726/2 |
| 6,488,211 B1 | 12/2002 | Everett et al. |
| 6,556,875 B1 | 4/2003 | Nagasaka et al. |
| 6,595,342 B1 | 7/2003 | Maritzen et al. |
| 6,618,772 B1 | 9/2003 | Kao et al. |
| 6,725,300 B1 | 4/2004 | Hisamatsu et al. |
| 6,839,756 B1 | 1/2005 | Boudou et al. |
| 6,917,836 B2 | 7/2005 | Nagasaka et al. |
| 7,010,688 B1 * | 3/2006 | Kawasaki ..................... 713/168 |
| 7,046,810 B2 * | 5/2006 | Takada et al. ................. 380/284 |
| 7,111,324 B2 * | 9/2006 | Elteto et al. ....................... 726/9 |
| 7,149,895 B1 * | 12/2006 | Asokan et al. ................ 713/159 |
| 7,272,715 B2 * | 9/2007 | Sueyoshi et al. ............. 713/156 |
| 7,487,203 B2 * | 2/2009 | Sueyoshi et al. ............. 709/203 |
| 7,505,941 B2 * | 3/2009 | Bishop et al. ................... 705/67 |
| 7,590,591 B2 * | 9/2009 | Terada et al. .................... 705/37 |
| 7,752,445 B2 * | 7/2010 | Satoh ............................. 713/173 |
| 7,788,500 B2 * | 8/2010 | Okamura et al. ............. 713/186 |
| 8,166,523 B2 * | 4/2012 | Ezaki et al. ........................ 726/5 |
| 2001/0014885 A1 | 8/2001 | Yanagi |
| 2001/0034719 A1 | 10/2001 | Durand et al. |
| 2003/0010818 A1 | 1/2003 | Asawaka |
| 2003/0182366 A1 | 9/2003 | Baker et al. |
| 2004/0127256 A1 | 7/2004 | Goldthwaite et al. |
| 2008/0010220 A1 * | 1/2008 | Hobson et al. .................. 705/76 |
| 2008/0034209 A1 * | 2/2008 | Dickinson et al. ............ 713/168 |

FOREIGN PATENT DOCUMENTS

| | | |
|---|---|---|
| JP | 2000-222335 | 8/2000 |
| JP | 2001-060187 | 3/2001 |
| JP | 2001-155075 | 6/2001 |
| JP | 2001-243503 | 9/2001 |
| JP | 2001-282538 | 10/2001 |
| WO | WO 01/24475 A2 | 4/2001 |

* cited by examiner

INFORMATION PROVIDING SYSTEM AND METHOD AND STORAGE MEDIUM

CROSS REFERENCE TO RELATED APPLICATIONS

This application is a Continuation of and is based upon and claims the benefit of priority under 35 U.S.C. §120 for U.S. Ser. No. 10/396,513 filed Mar. 26, 2003, which is a Continuation of U.S. Ser. No. 10/283,145, filed Oct. 30, 2002, and claims the benefit of priority under 35 U.S.C. §119 from Japanese Patent Application No. 2001-334969, filed Oct. 31, 2001.

FIELD OF THE INVENTION

The present invention relates generally to an information providing system and method and a storage medium which provide information services to an client apparatus on which a content browser and at least one object operate More particularly, the present invention relates to an information providing system and method and a storage medium which provide information services to a client apparatus on which an object such as an IC card operates.

Still more particularly, the present invention relates to an information providing system and method and a storage medium which write information content provided in an information space to an object such as an IC card via an information processing terminal and read the information content from the object. Yet more particularly, the present invention relates to an information providing system and method and a storage medium which associate read/write operations on a browser and an object on an information processing apparatus.

A variety of devices which use identification numbers and passwords for personal identification and authentication processing have been designed and put into practical use. For example, when users use their cash cards and credit cards at financial institutions such as banks, pay-in and pay-out operations are performed by financial terminals such as cash dispensers by prompting users to enter their identification numbers and passwords and confirming the entry of correct identification numbers and passwords as a means of verifying the identity of the users.

In a storage medium such as a magnetic stripe disposed on one piece of cash card, there is a storage area which is available to the bank only. Therefore, since the entry of the above-mentioned identification number or password is merely the access to this single storage area, the security against forgery and theft is hardly adequate.

For this reason, from the viewpoint of forgery prevention for example, contact-type IC cards having electrical contacts and non-contact-type IC cards on which data read/write operations are performed via wireless data have recently come to be widely used as cash cards and credit cards. For example, IC card reader/writer apparatuses installed inside cash dispensers and at the entrance of concert halls and the ticket barrier of railway stations can access the IC cards presented by their users in a non-contact manner.

Identification confirmation or authentication processing between the IC card and the IC card reader/writer is performed by matching the identification number entered by user into the IC card reader with the identification number stored on the IC card. When the identification confirmation or authentication processing is successful, an application for example stored in the IC card becomes available. This application includes the value information about electronic money or electronic tickets for example. (The identification number for use in IC card accessing is referred to as a PIN (Personal Identification Number).

Recently, with the rapid enhancement in microfabrication technologies, IC cards which have a comparatively large storage space have come into a wide use. Since conventional cash cards hold only a single storage area or a single application, a user must own a plurality of cards corresponding to various uses or purposes. On the other hand, the IC cards having a large memory such as above can store a plurality of applications at the same time, so that one IC card can be used for a plurality of uses. For example, two or more applications such as electronic money for electronic account settlement, an electronic ticket for a particular concert may be stored on a single IC card to apply it to various uses.

Moreover, the IC card may be connected to information processing terminals such as mobile phones, PDAs (Personal Digital Assistants), and personal computers via a reader/writer or via an external interface other than non-contact interface or an IC card chip may be incorporated in information processing terminals.

In this case, various application services based on the IC card may be executed on information processing terminals. For example, the user interaction to the IC card may be performed on information processing terminals by use of the user interface such as keyboard and display monitor of each terminal.

For example, if the IC card is connected to an information processing terminal connected to an information retrieval space such as the Internet, the user can search a WWW information space via a Web browser which operates on the information processing terminal and download (or write) retrieved content to the connected IC card or upload (or read) content from the IC card to a location retrieved in the WWW information space.

Meanwhile, a general-purpose Web browser can display, as a page screen, content such as HTML provided on a WWW server. Especially, recently, the server side can create dynamic pages by means of a scheme such as JSP (Java Server Pages). Handling designed HTML documents as JSP files allows the reflection of database values for example. For example, pages may be worked out as JSP files by designer and their servelet is described by developer for use of databases.

The Web browser can search the WWW information space for the locations of desired content. Therefore, the user can find the content necessary for peripheral devices such as IC cards connected to information processing terminals from the WWW information space by use of the Web browser.

However, the Web browser itself cannot directly operate the peripheral devices such as IC cards connected to information processing terminals. This consequently requires to have a device communication program for allowing peripheral devices such as IC cards to communicate with desired servers, in general.

The device communication program is activated by the Web browser for example, however, since the Web browser has no mechanism for operating cooperatively with the device communication program, no cooperative operation or synchronization is performed between them.

As described above, while Web servers can perform a dynamic page creating operation by use of a scheme such as JSP, this page creation cannot be linked with the communication program for devices such as IC cards.

SUMMARY OF THE INVENTION

It is therefore an object of the present invention to provide an information providing system and method and a storage medium for preferably moving information content provided in an information space to devices such as IC cards via an information processing terminal.

It is another object of the present invention to provide an information providing system and method and a storage medium for moving information content provided in an information space to devices such as IC cards via an information processing terminal while operating, in a cooperative manner, servers and clients in the information space and the devices connected to the clients It is still another object of the present invention to provide, via a browser for browsing content, an information providing system and method and a storage medium for providing information services to client apparatuses on which the browser and at least one object operate while providing a cooperation between the provision of content to the browser and the communication with the object.

According to the first aspect of the present invention, there is provided A system for providing information to a client apparatus on which a browser for browsing content and at least one object operate, including: a view server for providing content to the browser; a communication server for making communication with the object; and an application server for making the view server and the communication server cooperate with each other.

Term "system" as used herein denotes a logical collection of a plurality of apparatuses (or functional modules for implementing particular functions) and has no implication whether each of the apparatuses or modules is accommodated in a single housing.

According to the second aspect of the present invention, there is provided an information providing method for providing information services to a client apparatus on which a browser for browsing content and at least one object operate, including the steps of: providing content to the browser; making communication with the object; and making the view server and the communication server cooperate with each other.

The above-mentioned view server can dynamically generate content by use of JSP (Java Server Pages). Therefore, the cooperation with the communication server via the application server can allow to dynamically generate content synchronized with the communication with the object on the client apparatus side and provide the generated content to the browser.

For example, when connection is made with the object of the client apparatus, the communication server notifies the application server of the establishment of the connection, thereby can provide synchronization between the communication server and the view server.

When mutual authentication is performed with the object of the client apparatus, the communication server notifies the application server of a result of the mutual authentication, thereby can provide synchronization between the communication server and the view server.

When a read operation is performed on the object of the client apparatus, the communication server notifies the application server of a result of the read operation, thereby can provide synchronization between the communication server and the view server. In this case, in response to the read result notice from the communication server, the application server notifies the view server of the contents of the read result, thereby can synchronize display contents on the browser with the result of the read operation done on the object.

When a write operation is performed on the object of the client apparatus, the communication server notifies the application server of a result of the write operation, thereby can provide synchronization between the communication server and the view server. In this case, in response to the write result notice from the communication server, the application server notifies the view server of the contents of the write result, thereby can synchronize display contents on the browser with the result of the write operation done on the object.

When the communication with the object of the client apparatus is closed, the communication server notifies the application server of a result of the close operation, thereby can provide synchronization between the communication server and the view server.

According to the third aspect of the present invention, there is provided a storage medium storing a computer-readable software coded to execute, on a computer system, processing for providing information services to a client apparatus on which a browser for browsing content and at least one object operate, the computer-readable software including the steps of: providing content to the browser; making communication with the object; and making provision of content to the browser and communication with the object cooperate with each other.

The storage medium associated with the above-mentioned aspect provide, in a computer-readable form, computer software to a general-purpose computer system on which various program codes are executable, for example. This storage medium includes detachable and portable storage medium such as DVD (Digital Versatile Disc), CD (Compact Disc), FD (Floppy Disc), or MO (Magneto-Optical disc) for example. Alternatively, it is technologically possible to provide computer software to a particular computer system via a transmission medium such as a network (regardless of wired or wireless).

The storage medium associated with the above-mentioned aspect defines the cooperative relationship between computer software and storage medium in order to realize the functionality of particular computer software on a computer system. In other words, installation of predetermined computer software on a computer system via the storage medium associated with the above-mentioned aspect allows to provide a cooperative action on the computer system, thereby can provide generally the same functional effects as the system and the method associated with the above-mentioned respective aspects.

According to the first aspect of the present invention described above, an information providing system and method and a storage medium can be provided which are capable of moving information content provided in an information space to IC cards for example via an information processing terminal.

According to the second aspect of the present invention described above, an information providing system and method and a storage medium can be provided which are capable of moving information content provided in an information space to IC cards via an information processing terminal by making servers and clients in the information space and devices connected to the clients cooperate with each other.

According to the third aspect of the present invention described above, an information providing system and method and a storage medium can be provided which are capable of providing information services via a browser for browsing content to each client apparatus on which the browser and at least one object operate, through the cooperation with the operation of the object.

BRIEF DESCRIPTION OF THE DRAWINGS

These and other objects of the invention will be seen by reference to the description, taken in connection with the accompanying drawing.

DETAILED DESCRIPTION OF PREFERRED EMBODIMENTS

This invention will be described in further detail by way of example with reference to the accompanying drawings.

Figure 1:
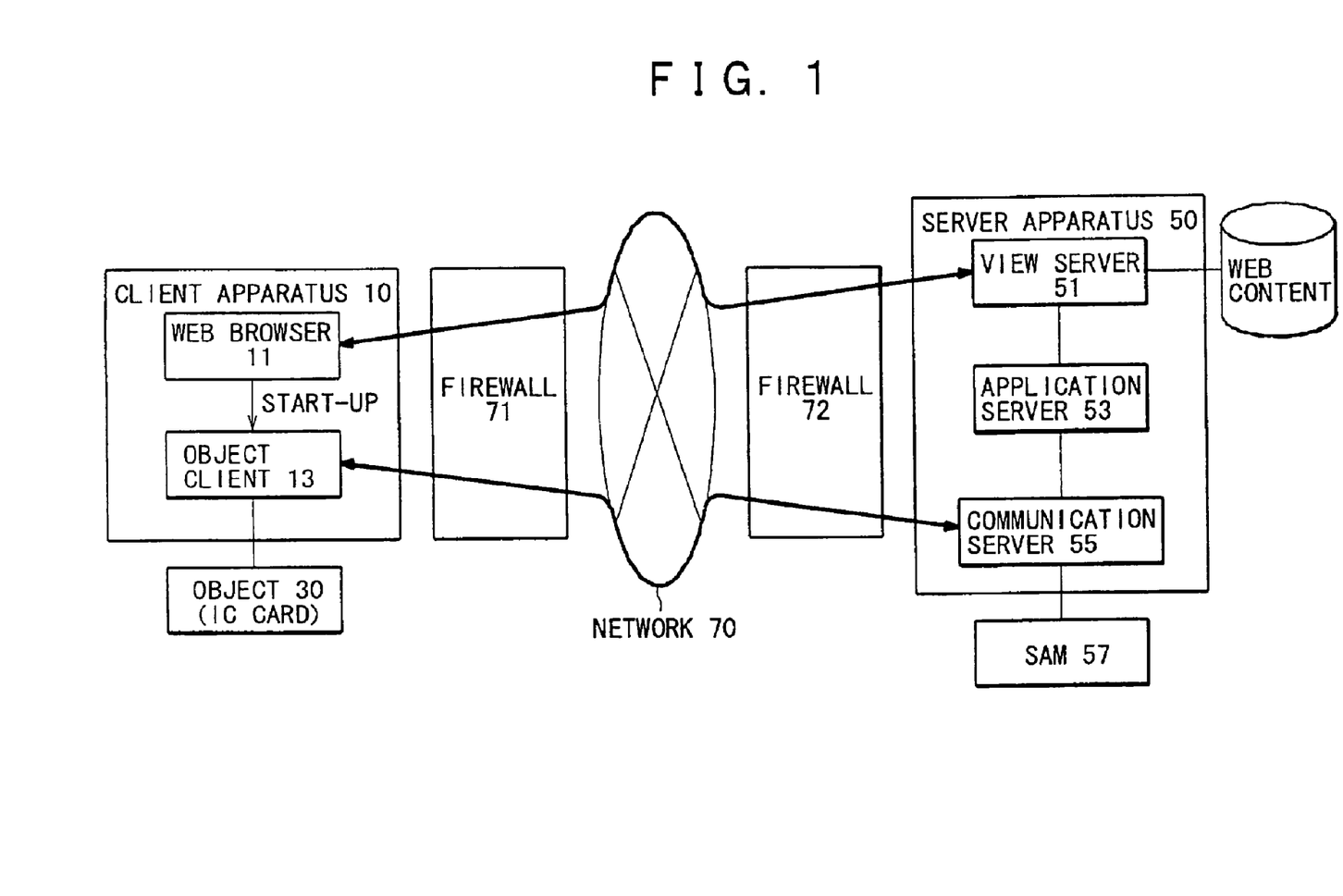
FIG. 1 is a schematic diagram illustrating a configuration of a network system associated with one embodiment of the present invention.

Now, referring to FIG. 1, there is schematically shown a configuration of a network system 1 practiced as one embodiment of the invention. On the network system 1, a client apparatus 10 which requests content and other network services and a server apparatus 50 which provides content and other services are interconnected via a network 70 and their firewalls 71 and 72. On the network 70, many clients and servers exist; however, for the brevity of description and prevention of complexity of drawings, only one client and one server are shown.

The client apparatus 10 is constituted by an information processing terminal such as a personal computer (PC), a mobile phone, or a PDA (Personal Digital Assistant) for example.

Figure 2:
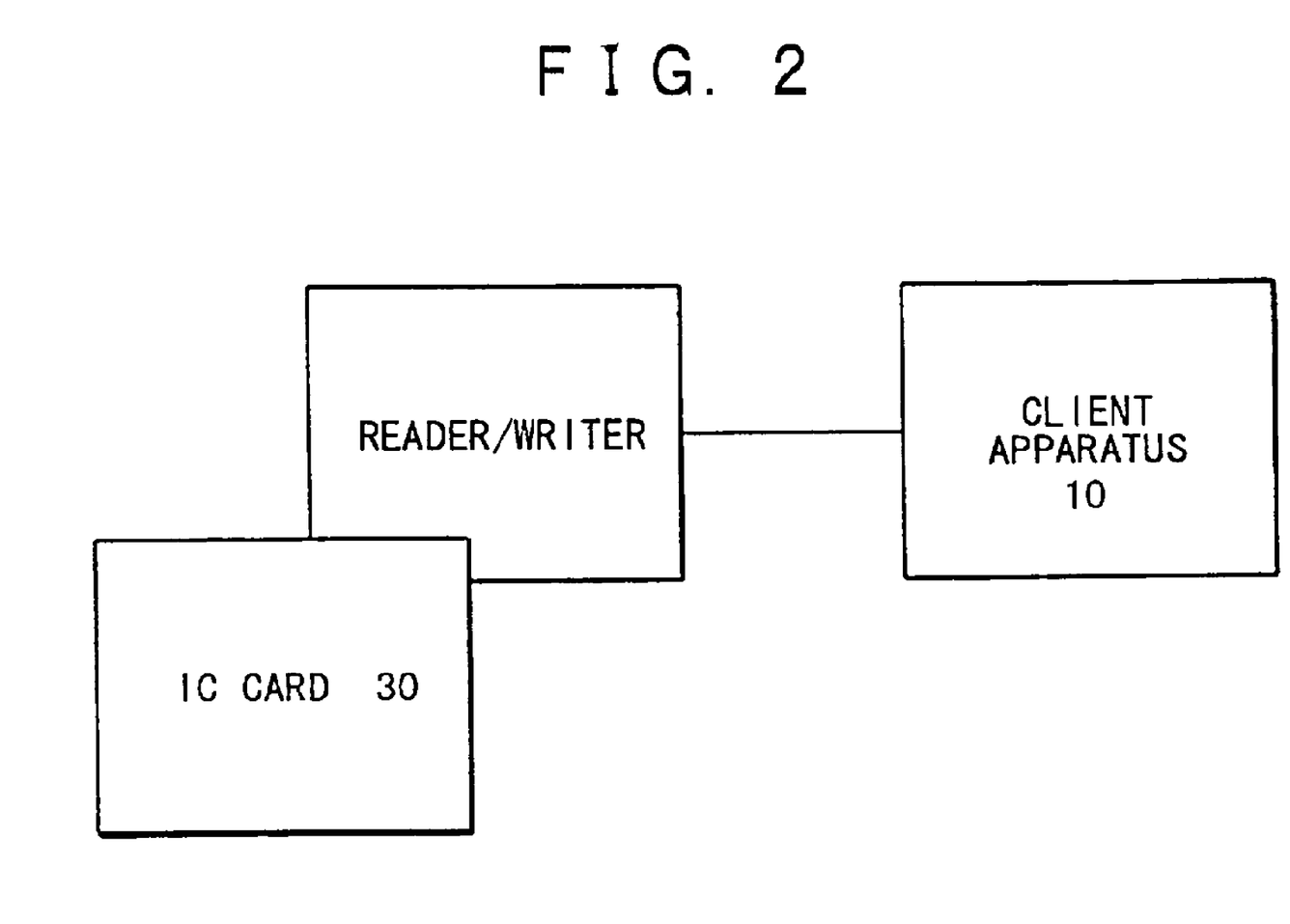
FIG. 2 is a schematic diagram illustrating the connection of an IC card 30 to a client apparatus 10 via an IC card reader/writer.

An IC card 30 having memory capability is connected to the client apparatus 10. There is not any special restriction to the connection form between the client apparatus 10 and the IC card 30. For example, the IC card 30 may be connected to the client apparatus 10 via an IC card reader/writer locally connected to the client apparatus 10 (refer to FIG. 2). For the client apparatus such as a mobile phone or a PDA, the IC card 30 may be connected to the client apparatus 10 via a card slot disposed thereon or via a wired interface or an IC card chip may be installed on the client apparatus 10. It should be noted that the IC card chip and the IC card are generically referred to an IC card herein.

Operating on the client apparatus 10 are a Web browser 11 for searching an information space such as WWW (World Wide Web) built on the network 70 and a client for object or an object client 13 for such an object operating on the client apparatus 10 as a peripheral device like the IC card 30 and an application to communicate with the server apparatus 50. In the example shown in FIG. 1, the client apparatus 10 has only the IC card 30 as an object which communicates with the server apparatus 50, so that only the single object client 13 is active; if a plurality of objects are operating, a plurality of object clients corresponding to these objects may operate.

The Web browser 11 and the object client 13 can send HTTP requests to the server apparatus 50 on the network 70 and receive HTTP responses from the server apparatus 50. However, because of the conditions such as the existence of firewalls and the network configuration, the Web browser 11 and object client 13 do not basically receive HTTP requests from the server apparatus 50.

On the other hand, the server apparatus 50 is constituted by such a computer system having a comparatively powerful computing power and a mass storage device as a workstation (WS) or a personal computer (PC). Generally, the server apparatus 50 is managed by a service providing business entity.

The server apparatus 50 provides information services to the client apparatus 10 on which the Web browser 11 and at least one object (for example, a peripheral device such as the IC card 30 and an application) On this server apparatus 50, a view server 51, an application server 53, and a communication server 55 are operating. Also, the server apparatus 50 has a temper-proof hardware module SAM (Secure Application Module) 57.

The view server 51 provides Web content described in HTML (Hyper Text Markup Language) to the Web browser. The present embodiment is adapted to provide dynamic HTML content to the view server 51 by use of JSP (Java Server Pages).

The communication server 55 controls the communication with such objects operating on the client apparatus 10 as a peripheral device like the IC card 30 connected to the client apparatus 10 and an application.

Generally, no cooperative operation is performed between the view server 51 and the communication server 55. On the client apparatus 10, there is no cooperative operation between the Web browser 11 and the object client 13 (the Web browser 11 may activate the object client 13, but, once the activation has been performed, the Web browser 11 and object client 13 operate independently of each other). Hence, the displaying of content supplied from the view server 51 to the Web browser 11 cannot be synchronized with the communication between the object such as the IC card 30 and the communication server 55. Namely, if the view server 51 can dynamically create content for the Web browser 11 on the basis of JSP for example, the displaying of the content is performed independently of the communication between the object such as the IC card 30 and the communication server 55.

On the contrary, in the present embodiment, the application server 53 performs a cooperative operation between the view server 51 and the communication server 55. Consequently, the view server 51 can dynamically generate Web content corresponding to the communication with such an object on the client apparatus 10 as the IC card 30 and, at the same time, the client apparatus 10 can display the page corresponding to the communication between the object on the client apparatus 10 and the server apparatus 50 onto the Web browser 11 (to be described later in more detail).

The SAM 57 hides all such access technologies associated with the IC card 30 as the key and logic for accessing the information of high security like the value information stored in the IC card 30. The communication server 55 uses the SAM 57 in order to access the IC card 30 in read/write operations and authenticate the IC card 30.

Figure 3:
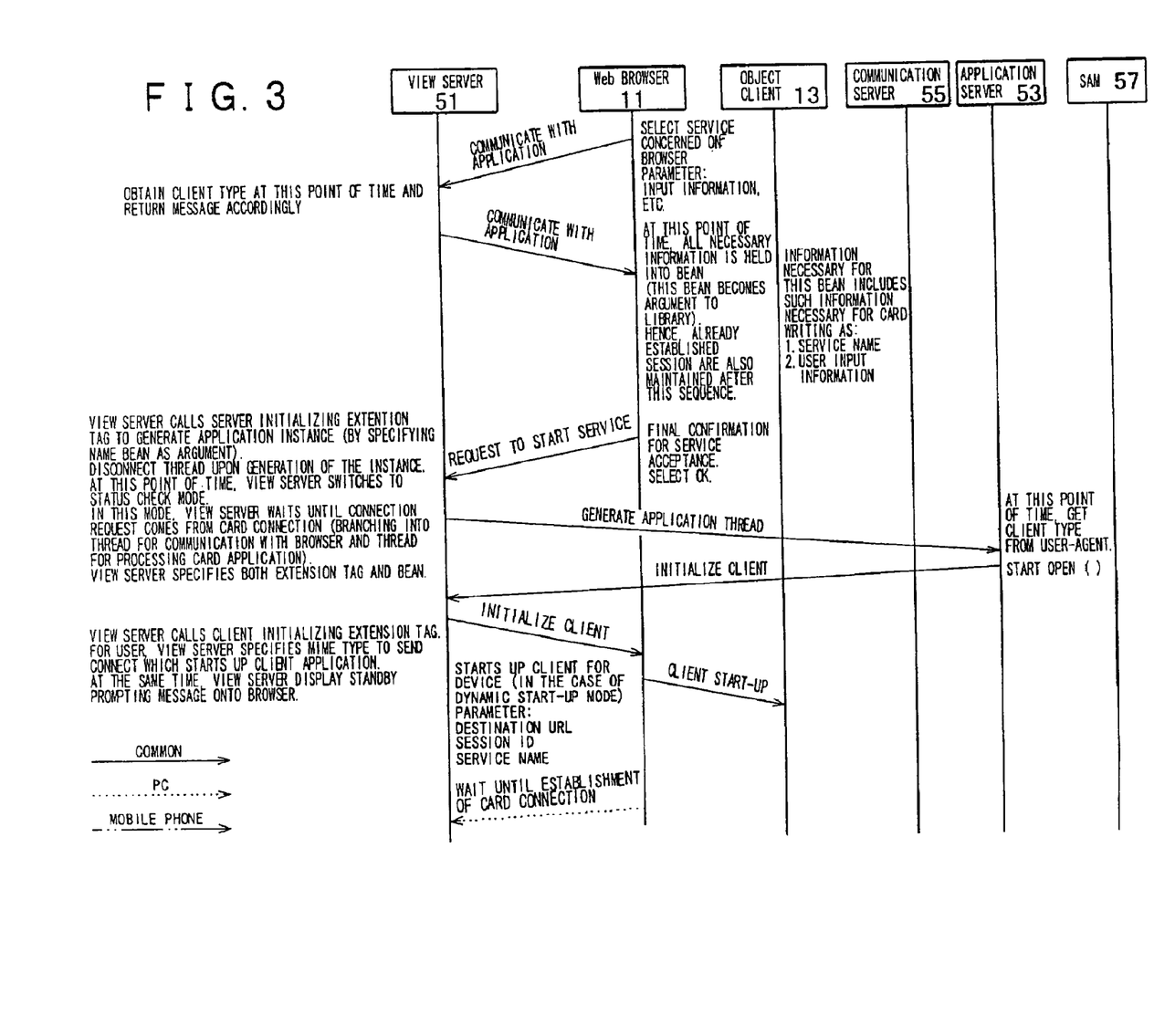
FIG. 3 is a sequence diagram illustrating a processing procedure for initializing the connection between an application and the IC card 30.
Figure 4:
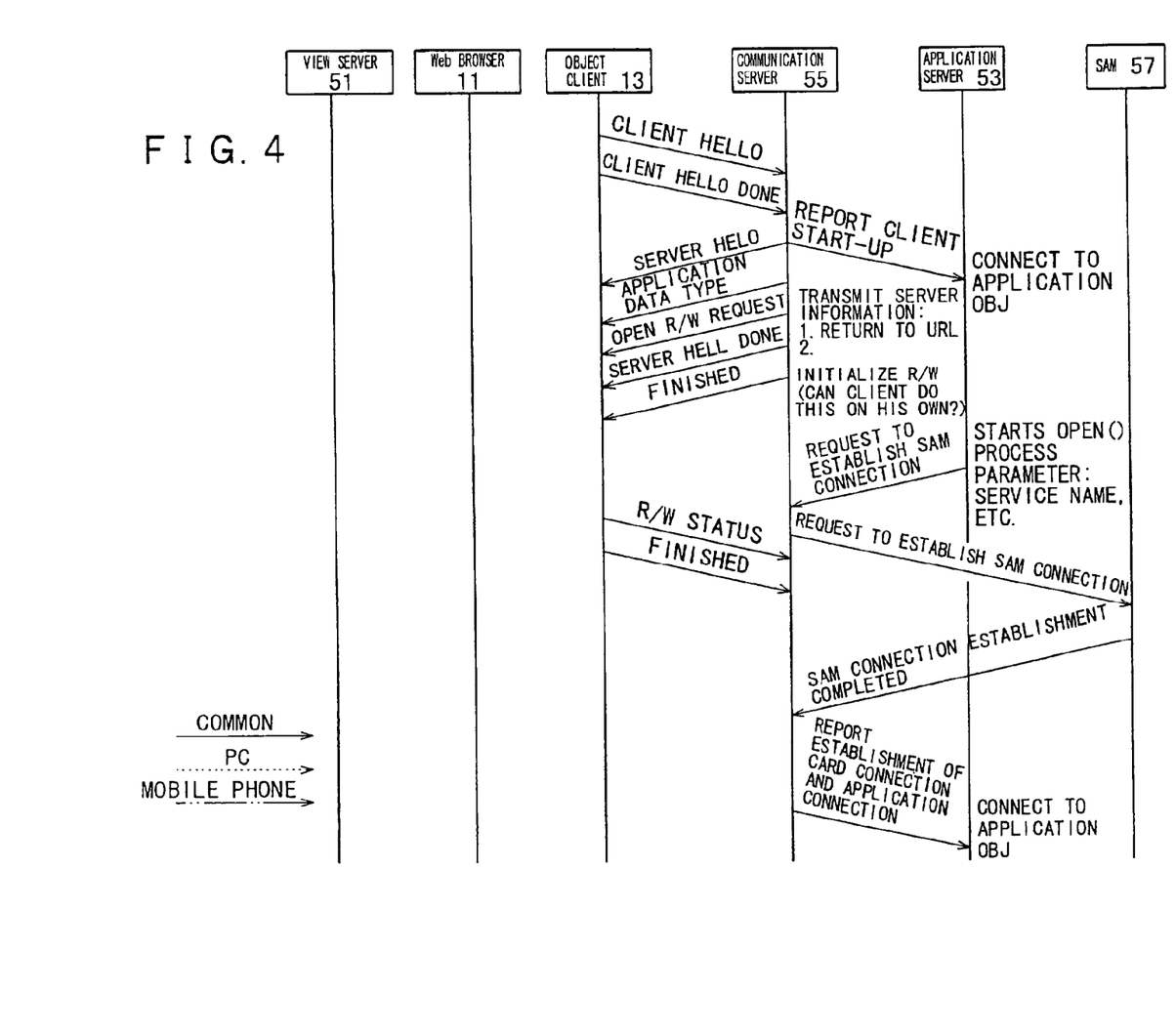
FIG. 4 is a sequence diagram illustrating another processing procedure for initializing the connection between an application and the IC card 30.

FIGS. 3 and 4 shows the processing procedures for initializing the connection between an application and the IC card 30.

When a user operating the client apparatus 10 selects a desired service on the screen of the Web browser 11 and then enters a predetermined parameter, the view server 51 gets the client type at this point of time and returns a corresponding message to the Web browser 11.

At this point of time, the view server 51 or the application server 53 holds all necessary information in Bean (this Bean becomes an argument to library; the information necessary for this Bean is such information necessary for writing to the IC card 30 as service name and user input information) Hence, the sessions already established are also maintained in the following sequences.

The user performs a final confirmation for service acceptance (by clicking the OK button, for example). In response, the Web browser 11 requests the view server 51 for starting service provision.

The view server 51 calls an expansion tag for initialization for server to generate an application instance for the IC card 30 (specifies name Bean as an argument). After generating the instance, the view server 51 disconnects the thread. At this point of time, the view server 51 switches to the status check mode. In this mode, the view server 51 waits until a connection request comes from the card connection (the threads branches into a thread for communicating with the Web browser 11 and a thread for processing a card application). The view server 51 specifies both the expansion tag and Bean.

In response to the generation of the application thread, the application server 53 gets the client type from the user agent and start an open operation, attempting to initialize the client.

Upon calling of an expansion tag for initializing for client, the view server 51 specifies MINE type to the user and sends content so that the object client 13 is activated for the object such as IC card 30 to communicate with the server apparatus 50. At the same time, view server 51 displays a message for prompting a wait onto the screen of the Web browser 11. Then, the view server 51 waits until connection is established between the application server 53 and the communication server 55.

In response to the message from the view server 51, the Web browser 11 requests to start the object client 13. At the same time, the Web browser 11 requests the view server 51 to wait until the connection, namely the card connection is established between the communication server 55 and the object client 13 (this is in the case in which the client apparatus 10 operates in a multi-thread mode as with a PC).

Subsequently, the object client 13 performs a handshake operation for establishing connection with the communication server 55.

The communication server 55 reports the activation of the client to the application server 53. The application server 53 connects to the application object.

The application server 53 requests the communication server 55 for the establishment of connection of the SAM 57. In response the communication server 55 issues a connection establishment request to the SAM 57.

Upon completion of the connection establishment, the SAM 57 sends information thereof to the communication server 55. Then, the communication server 55 reports the establishment of the card connection and the application connection to the application server 53. The application server 53 connects to the application object. As a result, synchronization is provided between the communication server 55 and the view server 51.

Figure 5:
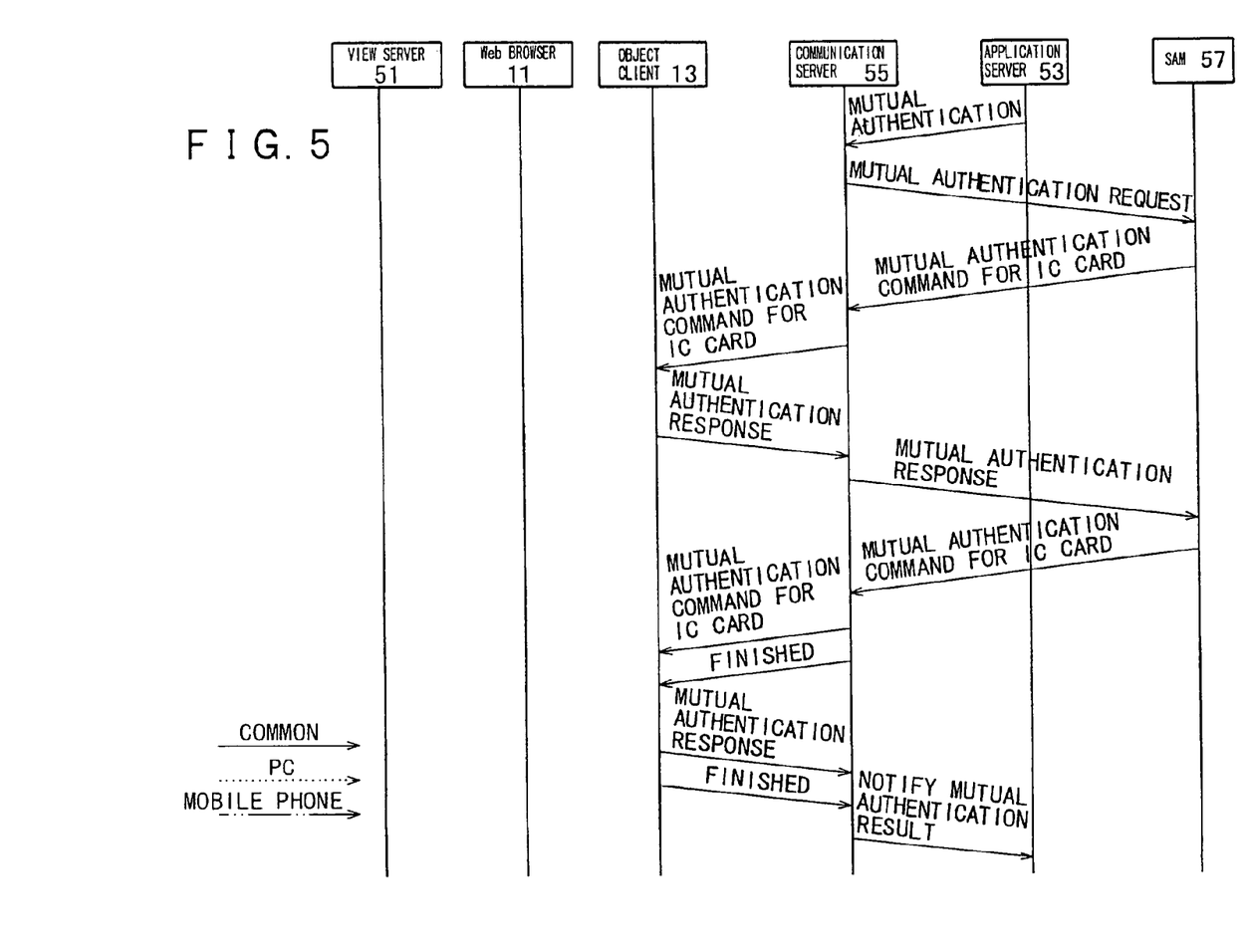
FIG. 5 is a sequence diagram illustrating a processing procedure for mutual authentication of the IC card 30.

FIG. 5 shows a processing procedure for performing mutual authentication of the IC card 30.

The application server 53 requests the communication server 55 for mutual authentication. In response, the communication server 55 issues a mutual authentication request to the SAM 57.

The SAM 57 sends a mutual authentication command for the IC card 30 to the communication server 55. The communication server 55 sends the received mutual authentication command for the IC card 30 to the object client 13.

The object client 13 performs a mutual authentication procedure for the IC card 30 which responded to the mutual authentication command and returns a mutual authentication response to the communication server 55. The communication server 55 sends the received mutual authentication response to the SAM 57.

The transmission of the mutual authentication command and the returning of the mutual authentication response are repeated by the necessary number of times. Then, lastly, the object client 13 sends a finished message to the communication server 55 and the communication server 55 sends a mutual authentication result to the application server 53, thereby providing synchronization between the communication server 55 and the view server 51, upon which this processing procedure comes to an end.

Figure 6:
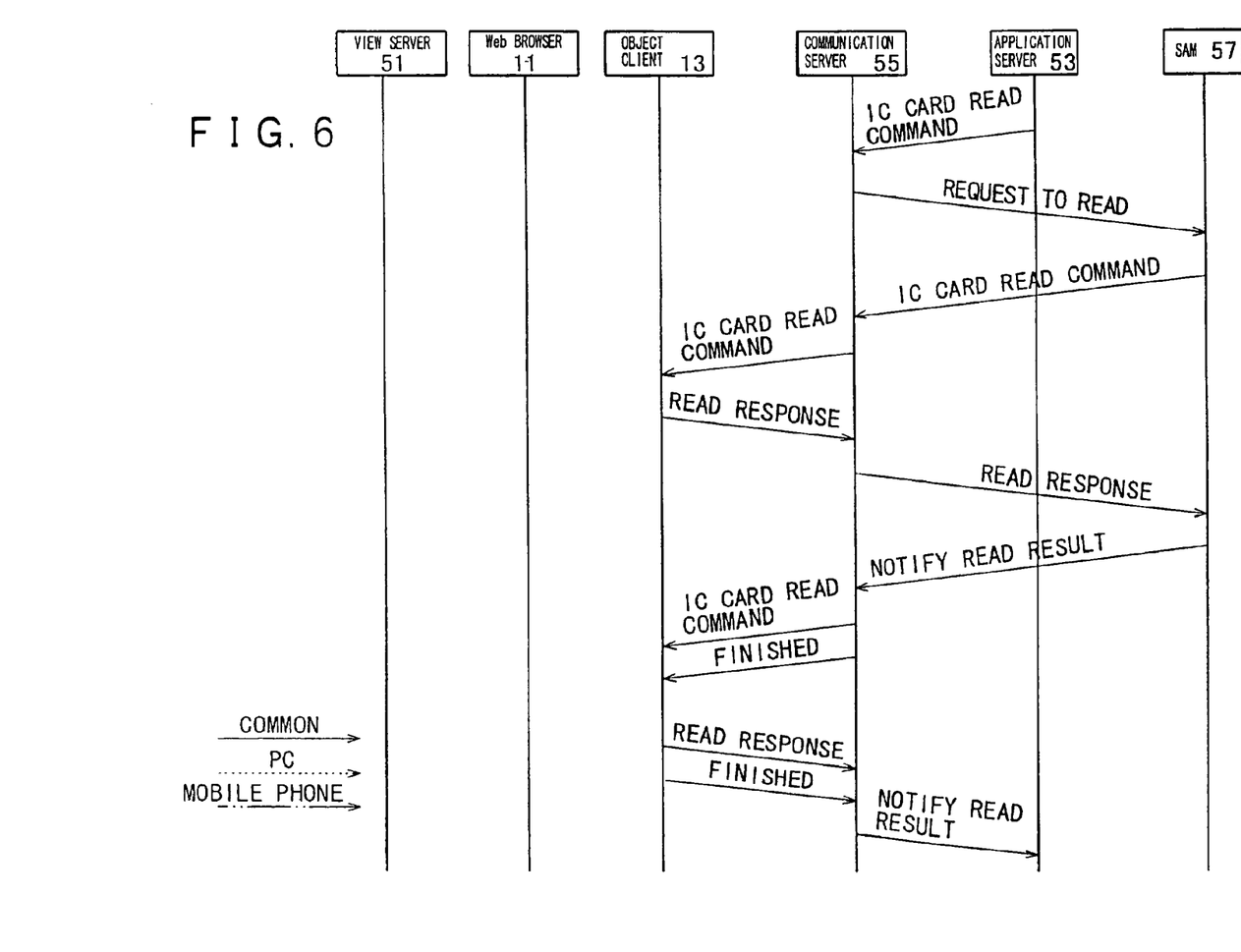
FIG. 6 is a sequence diagram illustrating a processing procedure for a server apparatus 50 to access the IC card 30 for a read operation via a client apparatus 10.

FIG. 6 shows a processing procedure for the server apparatus 50 to access the IC card 30 for a read operation via the client apparatus 10.

The application server 53 requests the communication server 55 for reading the IC card 30. In response, the communication server 55 issues a read request to the SAM 57.

The SAM 57 sends a read command for the IC card 30 to the communication server 55. The communication server 55 sends the received read command for the IC card 30 to the object client 13.

The object client 13 performs a read procedure on the IC card 30 which responded to the read command and returns a read response to the communication server 55. The communication server 55 transfers the read response to the SAM 57.

The transmission of the read command and the returning of the read response are repeated by the necessary number of times. Then, lastly, the object client 13 sends a finished message to the communication server 55 and the communication server 55 sends a read result to the application server 53, thereby providing synchronization between the communication server 55 and the view server 51, upon which this processing procedure comes to an end.

Figure 7:
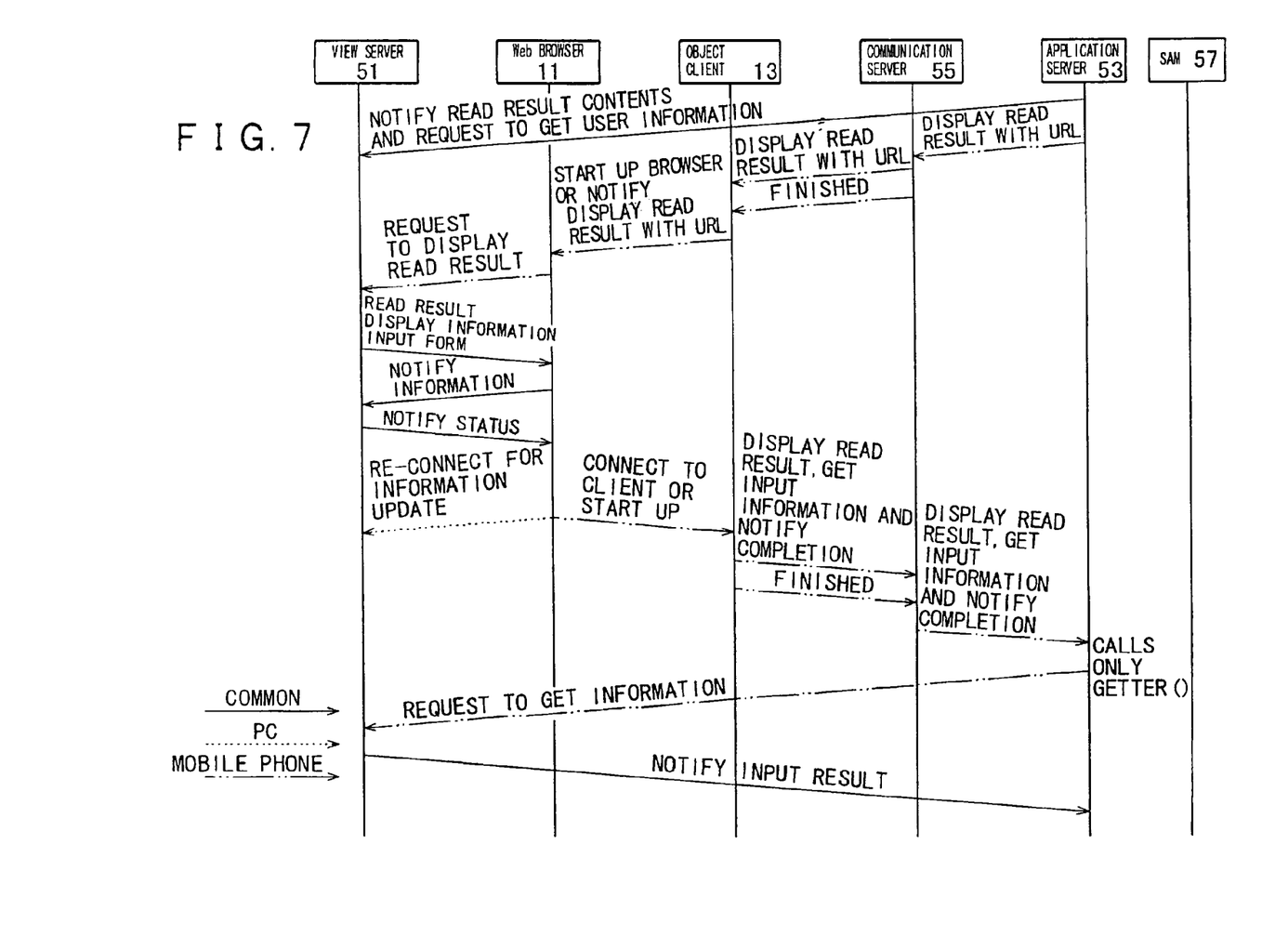
FIG. 7 is a sequence diagram illustrating a processing procedure for the server apparatus 50 to display a result of reading from the IC card 30 onto a Web browser 11 of the client apparatus 10.

FIG. 7 shows a processing procedure for the server apparatus 50 to display a read result from the IC card 30 onto the Web browser 11 of the client apparatus 10.

In response to the result report (refer to FIG. 6), the application server 53 sends the contents of the read result and issues a user information get request to the view server 51.

If the client apparatus 10 is not a PC but a device which operates on a single thread like a mobile phone, the Web browser 11 is in a stopped state while the 13 is operating. Hence, application server 53 activates the Web browser 11 via the communication server 55 and object client 13 to transfer a read result display request with URL. The Web browser 11 performs the read result display request on the view server 51 on the basis of the received URL.

In response to the read result display request, the view server 51 sends a read result display information input form to the Web browser 11. In response, the Web browser 11 sends the information to the view server 51 and view server 51 sends the status to the Web browser 11. The view server 51 dynamically generates contents corresponding to the state of communication with the IC card 30 by use of a scheme such as JSP. As a result, by the cooperation between the view server 51 and the communication server 55 on the side of the server apparatus 50, the Web browser 11 can present to the user the page which is synchronized with the communication state of the object, namely the IC card 30.

If the client apparatus 10 is a device which operates on multiple threads such as a PC, the Web browser 11 requests the view server 51 for information update re-connection.

If the client apparatus 10 is a device which operates on a single thread like a mobile phone, the object client 13 is in a stopped state while the Web browser 11 is operating, so that the Web browser 11 requests the object client 13 for connection or activation and sends a read result display input information get completion notice to the application server 53 via the communication server 55. The application server 53 issues an information get request to the view server 51.

In response to the information update re-connect request from the Web browser 11 or the information get request from the application server 53, the view server 51 sends an input result notice to the application server 53.

Receiving the read result display information input form, the Web browser 11 can enter the information to be written to the object, namely the IC card 30 or the information which affects the information to be written to the IC card 30. At the same time, the Web browser 11 can sends the entered information from the view server 51 to the application server 53. Receiving this information, the application server 53 can manipulate the received information and send a notice to the object, namely the IC card 30 via the communication server 55 to specify an operation such as read or write which corresponds to the object and user request.

Figure 8:
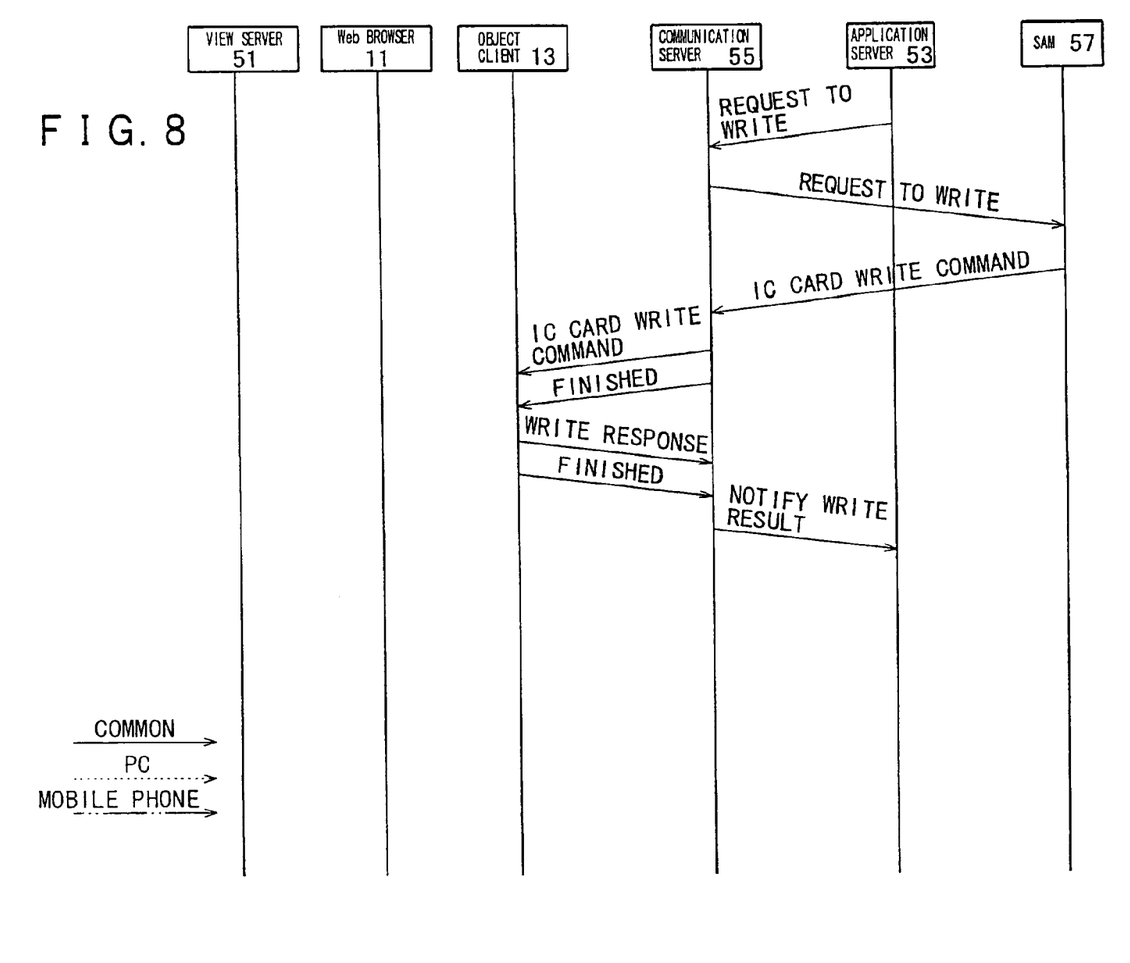
FIG. 8 is a sequence diagram illustrating a processing procedure for the server apparatus 50 to access the IC card 30 for a write operation via the client apparatus 10.

FIG. 8 shows a processing procedure for the server apparatus 50 to access the IC card 30 for a write operation via the client apparatus 10.

The application server 53 requests the communication server 55 to write to the IC card 30. In response, the communication server 55 issues a write request to the SAM 57.

The SAM 57 sends the write command for the IC card 30 to the communication server 55. The communication server 55 sends the received write command for the IC card 30 to the object client 13.

The object client 13 performs a read procedure on the IC card 30 which responded to the write command and returns a write response to the communication server 55. The communication server 55 sends the received write response to the SAM 57.

The transmission of the write command and the returning of the corresponding write response are repeated by the necessary number of times. Lastly, the object client 13 sends a finished message to the communication server 55. At the same time, when the communication server 55 reports a write result to the application server 53, synchronization is provided between the communication server 55 and the view server 51, upon which this processing procedure comes to an end.

Figure 9:
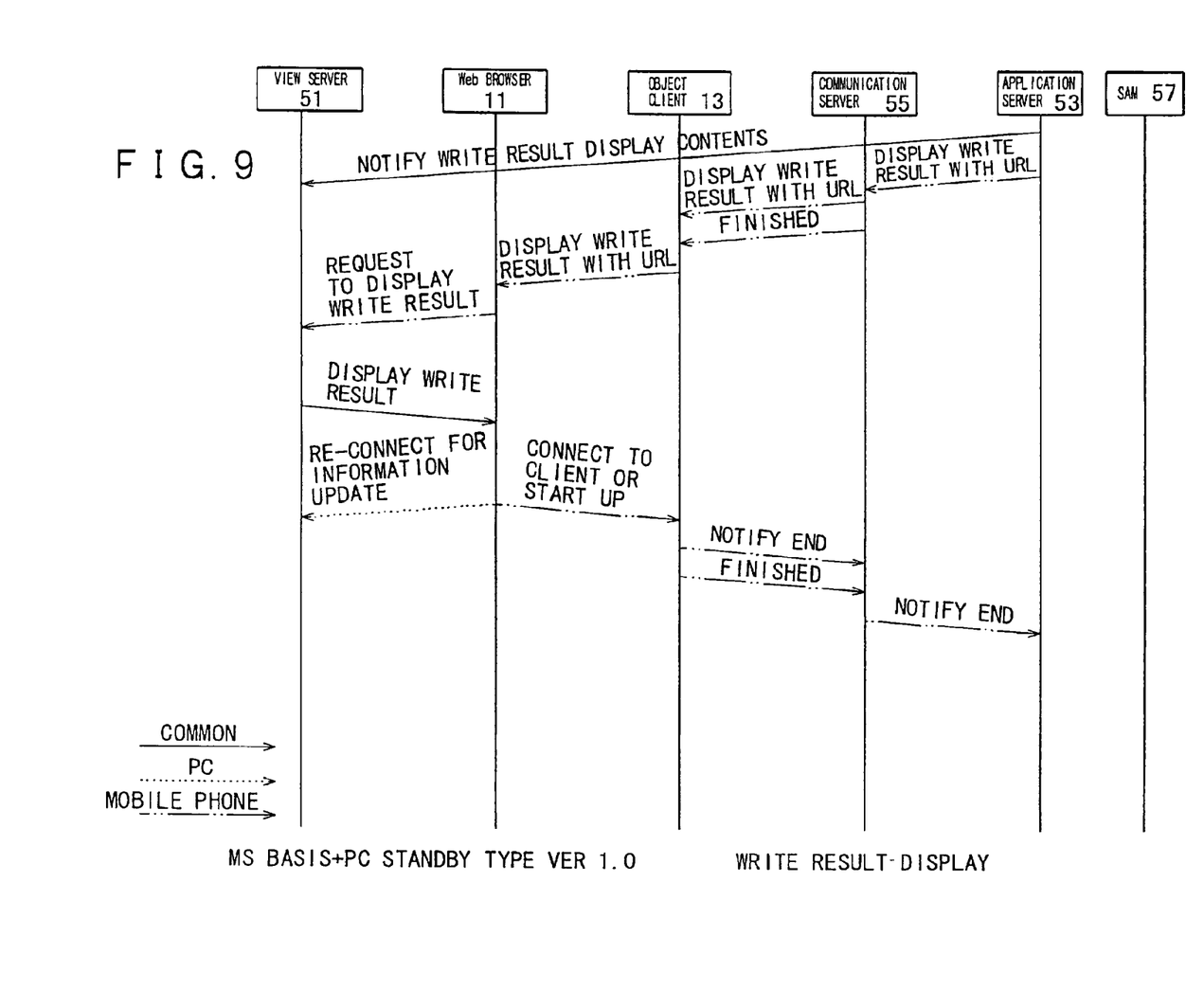
FIG. 9 is a sequence diagram illustrating a processing procedure for the server apparatus 50 to display a result of writing to the IC card 30 onto the Web browser 11 of the client apparatus 10.

FIG. 9 shows a processing procedure for the server apparatus 50 to display a result of writing to the IC card 30 onto the Web browser 11 of the client apparatus 10.

In response to a write result notice (refer to FIG. 8), the application server 53 issues a write result contents notice to the view server 51.

If the client apparatus 10 operates not on a PC but on a single thread such as a mobile phone, the Web browser 11 is in the stopped state while the object client 13 is operating. Hence, the application server 53 activates the Web browser 11 via the communication server 55 and the object client 13 to send the write result contents notice to the Web browser 11 as in a form of write result display with URL. Then, on the basis of the received URL, the Web browser 11 requests the view server 51 for displaying the write result.

In response to the write result display request, the view server 51 displays the write result onto the Web browser 11. The view server 51 dynamically generates the content corresponding to the state of communication with the IC card 30 by use of a scheme such as JSP. As a result, by the cooperation between the view server 51 and the communication server 55 on the side of the server apparatus 50, the Web browser 11 can present to the user the page which is synchronized with the communication state of the object, namely the IC card 30.

If the client apparatus 10 is a device which operates on multiple threads such as a PC, the Web browser 11 requests the view server 51 for information update re-connection.

If the client apparatus 10 operates on a single thread such, as a mobile phone, the object client 13 is in the stopped state while the Web browser 11 is operating, so that the Web browser 11 requests the object client 13 for connection or activation and sends a close notice to the application server 53 via the communication server 55.

Figure 10:
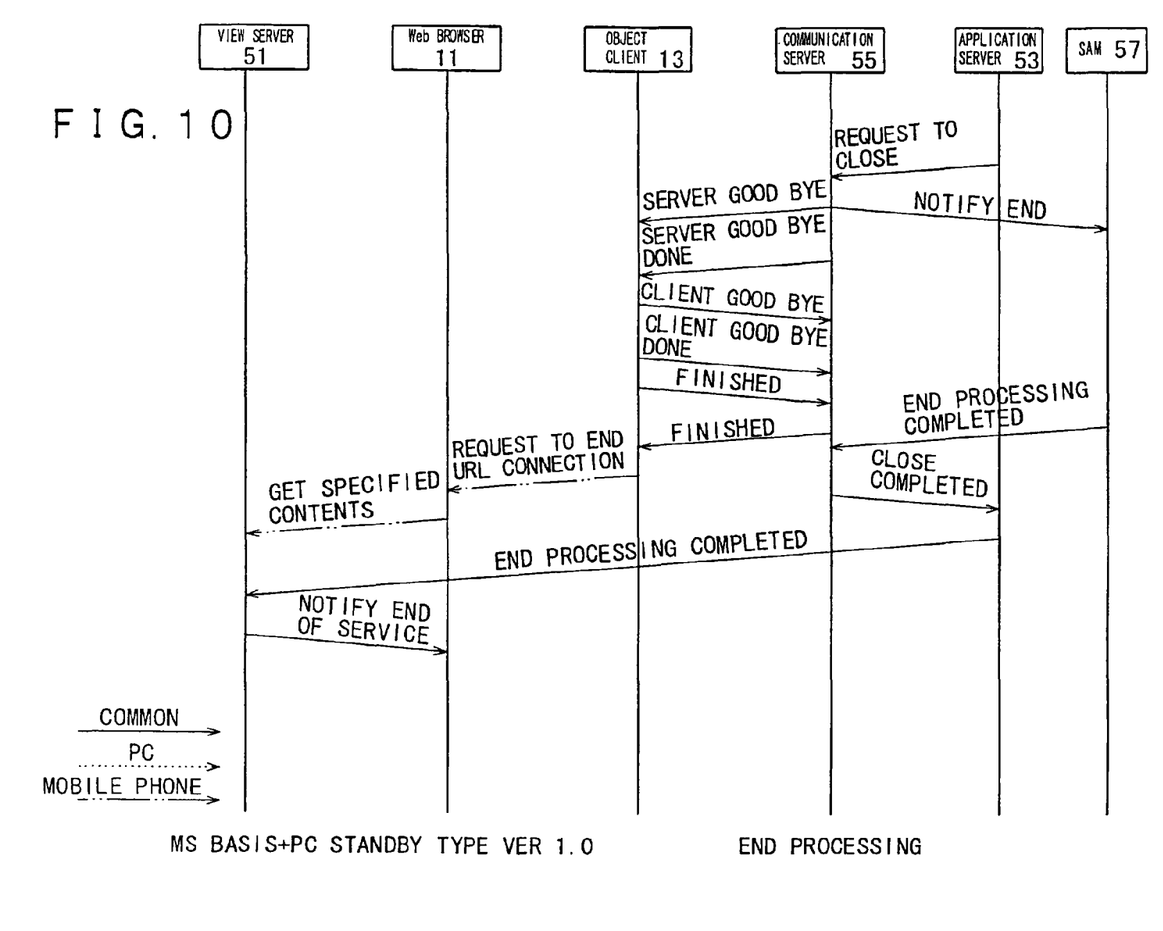
FIG. 10 is a sequence diagram illustrating a processing procedure for the server apparatus 50 to close the communication with the client apparatus 10.

FIG. 10 shows a processing procedure for the server apparatus 50 to end the communication with the client apparatus 10.

the application server 53 issues a close request to the communication server 55.

In response to the close request, the communication server 55 sends a close notice to the SAM 57 and, at the same time, performs a handshake operation with the object client 13 for close processing.

If the client apparatus 10 is a device which is built-in device such as a mobile phone, the object client 13 issues a connection request to the Web browser 11 for connection to the close URL. In response, the Web browser 11 accesses the view server 51 to get the content specified by the URL.

When the close processing has been completed, the SAM 57 returns the information thereof to the communication server 55. The communication server 55 notifies the application server 53 of the completion of close operation.

The application server 53 notifies the view server 51 of the completion of close processing. As a result, synchronization is provided between the communication server 55 and the view server 51.

The view server 51 notifies the Web browser 11 of the end of service. The user operating the client apparatus 10 can know the end of service on the screen of the Web browser 11.

While the preferred embodiments of the present invention have been described using specific terms, such description is for illustrative purposes only, and it is to be understood that changes and variations may be made without departing from the spirit or scope of the appended claims. It is therefore necessary for the understanding of the present invention to take the scope of claims herein into account.

The invention claimed is:

1. A system to provide information to a client apparatus on which a browser to browse content and an object client operate, the object client communicating with an object connected to the client apparatus, the system comprising:
 a view server configured to provide content to said browser over a network;
 a communication server configured to make communication with said object client over the network, wherein the communication server is configured to:

issue a mutual authentication request to a secure application module (SAM);

receive, from the SAM, a mutual authentication command for the object that is connected to the client apparatus;

send the received mutual authentication command over the network to the object client, which is executing on the client apparatus;

receive a mutual authentication response over the network from the object client; and send the received mutual authentication response to the SAM; and an application server configured to:

request, to the communication server, establishment of a connection to the SAM, receive, from the communication server, a report of the establishment of the connection to the SAM, and receive, from the communication server, a report of the establishment of a connection to the object, which is connected to the client apparatus, to provide synchronization between the communication server and the view server, wherein the application server performs a cooperative operation between the view server and the communication server, but the communication server does not communicate directly with the view server.

2. The system as recited in claim 1, wherein the application server is further configured to:

request that the communication server use the SAM to read the information from the object, obtain a read result, and synchronize with the view server upon receiving the result.

3. The system as recited in claim 2, wherein the application server is further configured to:

send the read result to the view server, and request that the communication server prompt the browser to request the read result from the view server.

4. The system as recited in claim 3, wherein the view server is further configured to:

send a form requesting user input to the browser, receive inputted information from the browser, and dynamically generate for display on the browser contents corresponding to a state of communication with the object.

5. The system as recited in claim 1, wherein the application server is further configured to:

request that the communication server use the SAM to write first information to the object, receive a write result, and synchronize with the view server upon receiving the result.

6. The system as recited in claim 5, wherein the application server is configured to:

send the write result to the view server, and request that the communication server prompt the browser to request the write result from the view server.

7. The system as recited in claim 6, wherein the view server is further configured to dynamically generate for display on the browser contents corresponding to a state of communication with the object.

8. A method for providing information to a client apparatus on which an object client operates, the object client communicating with an object connected to the client apparatus, the method comprising:

requesting, to a communication server from an application server, establishment of a connection to a secure application module (SAM);

receiving, from the communication server, a report of the establishment of the connection to the SAM;

issuing, by the communication server, a mutual authentication request to the SAM;

receiving, by the communication server from the SAM, a mutual authentication command for the object that is connected to the client apparatus;

sending, by the communication server, the received mutual authentication command over a network to the object client, which is executing on the client apparatus;

receiving, by the communication server, a mutual authentication response over the network from the object client;

sending, by the communication server, the received mutual authentication response to the SAM; and receiving, from the communication server, a report of the establishment of a connection to the object, which is connected to the client apparatus, to provide synchronization between the communication server and a view server, wherein the application server performs a cooperative operation between the view server and the communication server, but the communication server does not communicate directly with the view server.

9. The system of claim 1, wherein the application server is further configured to:

receive, from the view server, a request to initialize the object client, and in response, start an open operation and send a return initialize instruction to the view server; and receive a report of activation of the object client from the communication server.

10. The method of claim 8, further comprising:

receiving, from the view server by an application server, a request to initialize the object client, and in response, starting an open operation and sending a return initialize instruction to the view server; and receiving, by the application server from the communication server, a report of activation of the object client.

11. The system of claim 1, wherein no cooperative operation is performed between the browser and the object client on the client apparatus.

* * * * *